United States Patent [19]
Bonomi et al.

[11] Patent Number: 5,864,540
[45] Date of Patent: Jan. 26, 1999

[54] METHOD FOR INTEGRATED TRAFFIC SHAPING IN A PACKET-SWITCHED NETWORK

[75] Inventors: Flavio Giovanni Bonomi, Palo Alto, Calif.; Albert Gordon Greenberg, Millburn; Jennifer Lynn Rexford, Summit, both of N.J.

[73] Assignee: AT&T Corp/CSI Zeinet(A Cabletron Co.), Middletown, N.J.

[21] Appl. No.: 825,990

[22] Filed: Apr. 4, 1997

[51] Int. Cl.$^6$ .................................................. H04J 3/14
[52] U.S. Cl. ................................. 370/235; 370/413
[58] Field of Search ................................. 370/229, 230, 370/231, 232, 233, 234, 235, 236, 412, 413, 414, 415, 416, 417, 418, 389, 392, 395, 428, 429, 465, 468

[56] References Cited

U.S. PATENT DOCUMENTS

| | | | |
|---|---|---|---|
| 5,260,935 | 11/1993 | Turner | 370/418 |
| 5,268,900 | 12/1993 | Hluchyi | 370/418 |
| 5,499,238 | 3/1996 | Shon | 370/399 |
| 5,515,363 | 5/1996 | Ben-Nun et al. | 370/412 |
| 5,602,830 | 2/1997 | Fichou et al. | 370/412 |
| 5,629,937 | 5/1997 | Hayter et al. | 370/412 |

OTHER PUBLICATIONS

Pierre E. Boyer, Fabrice M. Buillemin, Michael J. Servel, and Jean–Pierre Courdreuse; "Spacing Cells Protects and Enhances Utilization of ATM Network Links," IEEE Network, Sep., 1992, pp. 38–49.

Eugene Wallmeir and Tom Worster; "The Spacing Policer, An Algorithm for Efficient Peak Bit Rate Control in ATM Networks," Proceedings of 14th International Switching Symposium; Oct., 1992, vol. 2, A5.5, pp. 22–26.

Jennifer L. Rexford, Albert G. Greenberg, and Flavio G. Bonomi; "Hardware–Efficient Fair Queueing Architectures for High–Speed Networks," Proceedings of IEEE Infocom '96, Mar., 1996.

Jon C. R. Bennet and Hui–Zhang, "Hierarchical Packet Fair Queueing Algorithms," Proceedings of ACM SIGCOMM, Aug., 1996, pp. 143–156.

Jennifer Rexford, Flavio Bonomi, Albert Greenberg, and Albert Wong; IEEE INFOCOM; A Scalable Architecture for Fair Leaky–Bucket Shaping, 1997.

Jennifer Rexford, Flavio Bonomi, Albert Greemberg and Alberg Wong; IEEE Journal on Selected Areas in Communications Special Issue on Advances in ATM Switching Systems; Scalable Architectures for integrated Traffic Shaping and Link Scheduling in High–Speed ATM Switches, 1997.

*Primary Examiner*—Huy D. Vu

[57] ABSTRACT

A scalable integrated traffic shaper for a use in a packet-switched network that regulates multiple connections and prevents lost data by integrating link scheduling and traffic shaping to fairly arbitrate between incoming connections.

18 Claims, 5 Drawing Sheets

METHOD FOR INTEGRATED TRAFFIC SHAPING IN A PACKET-SWITCHED NETWORK

FIELD OF THE INVENTION

The invention relates generally to controlling traffic in a communications network. More particularly, the invention relates to integrated traffic shaping in an asynchronous transfer mode (ATM) switch operating in a high speed network.

BACKGROUND OF THE INVENTION

Communications networks currently transfer vast quantities of information in both local and wide area networks The information typically consists of signals (electronic or optical) representing digitized or digital voice, video, and/or data that is transferred between endpoints in networks. For information to be transmitted in a network, a communication path must be established within the network between the sender(s) and receiver(s) of the information. A communication path may be established by circuit switching, wherein an exclusive channel is established between the sender(s) and receiver(s) throughout the entire transmission and until the connection is released. Alternatively, a communication path may be established by packet switching, wherein virtual circuits or channels are established between sender(s) and receiver(s) and with the channel only occupied for the duration of transmission of the packet.

Packet switching enables networks to handle the heterogenous mix of network traffic with varying service requirements that are encountered in Broadband Integrated Services Digital Networks (B-ISDN). Ideally, packet switching is scalable and can reliably establish and maintain virtual channels without any prespecified rates (so-called bandwidth on demand). Asynchronous Transfer Mode (ATM) is a connection oriented network technology that provides a possible framework for ideal packet switching that is designed to support multiple classes (e.g., voice, video, data) of traffic.

In ATM, information is transmitted as packets of digital information called cells. Each cell includes 53 bytes of digital information, ATM is connection oriented; a connection is formed between the transmitter(s) and receiver(s) where each intermediate switch in the virtual circuit or channel (VC) is aware of the service requirements and traffic parameters of the connection. The links between switches are "virtual" only in that each link may be shared by several connections on a demand basis instead of a fixed allocation of the entire link to a single connection as in a circuit-switched network. By making each switch aware of the service requirements and traffic parameters for each connection, the quality of service (QOS) of the channel can be guaranteed by the network if the connection stays within its stated traffic parameters.

The quality of service in an ATM-switched network typically refers to the probability of a cell being dropped, (cell loss) and factors affecting cell delivery timeliness, particularly cell delay and cell delay variation. Traffic parameters typically refer to the rate at which data bits are transmitted through the network (bit rate) and the variations in the bit rate (burstiness). Different classes of traffic require different levels of QOS and have different traffic parameters. For example, voice communications are typically transmitted at a continuous bit rate (CBR) of 64 Kbit/second with no burstiness and can tolerate some cell loss but little delay. Another example is compressed packetized voice or video which is transmitted at a variable bit rate (VBR) with varying degrees of burstiness and bounded limits on delay because of the need to reconstruct the video or voice. Computer file transfer and data network applications, on the other hand, will generate data at widely varying rates without stringent requirements regarding cell delay and may be readily transmitted whenever bandwidth is available in the channel at the available bit rate (ABR). Available Bit Rate traffic may also be classified as Unspecified Bit Rate (UBR) if no minimum cell rate is declared.

The QOS of a connection in an ATM switched network may be "guaranteed" by "contract" when a connection is established through a process of connection admission control (CAC). Essentially, each connection "contracts" to transmit cells to the network at a rate $\rho$ (bandwidth descriptor) with burstiness $\sigma$ (burst descriptor) when the connection is established. The network will not allow the connection to be established if there are insufficient network resources (e.g., buffer and/or bandwidth) to provide the required QOS at the contracted traffic parameters.

Once connections have been established, the connections have to be regulated to prevent congestion in the network. Although each connection is expected to comply with the contracted traffic parameters, it is necessary for the network to ensure compliance by the connection. Prior art techniques for regulating connections (traffic control) include policing the connection and discarding excess cells (i.e., cells violating the contracted traffic parameters) seeking to enter the network. See, e.g., Boyer, P., "A Congestion Control for the ATM," Proc. 7th ITC Spec. Seminar, Paper 4.3, New Jersey, October, 1990 (Describing pick-up policing algorithms). Prior art techniques have also suggested policing by tagging the cell loss priority (CLP) bit of non-compliant cells and only discarding the cells if the network becomes sufficiently congested to adversely affect network performance.

Traffic shaping is another form of traffic control for ATM switched networks. Traffic shaping can be used to ensure compliance with the traffic contract when applied at the edge of the network or, if applied within the network interior, to normalize traffic and limit jitter by reshaping connections and spacing cells. So-called "leaky bucket traffic shaping" is often used in ATM switched networks. In a typical prior art leaky bucket traffic shaper, credit "tokens" are provided by the traffic shaper at a rate $\rho$ that represents the sustainable bandwidth for the connection. For example, tokens could be provided at a rate of one token every ten time slots, where a time slot represents the minimum time for a cell to leave the traffic shaper. In other words, a fully utilized traffic shaper would transmit one cell every time slot. These credit tokens accumulate in a "leaky bucket" that holds up to $\sigma$ (burst size) credit tokens. Each cell arriving at the traffic shaper must claim a token to pass through the shaper; if no tokens are available, the cell is considered "nonconforming" and is delayed until a token is available when the connection conforms to the traffic contract.

A traffic shaper determines whether an arriving cell conforms to its connection's traffic parameters or descriptors using any of a variety of algorithms known in the art, the most common of which is the generic cell rate algorithm (GCRA) from the ATM Forum. The GCRA computes conformance based on a connection's shaping rate and burstiness and when the last cell arrived at the shaper from that connection.

Cells are scheduled for transmission from a traffic shaper based on the cell's conformance times. In typical prior art traffic shapers, cells are sorted in exact order of conformance times. One prior art implementation is a shift register wherein the sorted cells (or pointers) are stored and appropriately shifted when a cell with an intermediate conformance time is added. This implementation is disadvantageous because of the prohibitive hardware costs incurred by parallel comparison operations and additional circuitry needed to compensate for clock rollovers.

An alternative prior art traffic shaper avoided these drawbacks by implementing the scheduler as a series of bins corresponding to single transmission slots. By traversing the bins at the transmission, the traffic shaper can transmit one cell at each time slot if there is a cell awaiting transmission in the bin. If the bin is empty then a cell will not be transmitted during that time slot. This traffic shaper puts an arriving cell into the first bin that corresponds to or follows its conformance time. There are, however, several disadvantages with this implementation. Complex logic is required to locate an appropriate empty bin and, under heavy traffic conditions a cell may be scheduled for transmission far after its conformance time. Moreover, early arrivals inherently receive preferential treatment at the expense of cells arriving from connections adhering to traffic contract parameters.

Some of these disadvantages have been addressed by another prior art traffic shaper using a calendar queue where each bin corresponds to a linked list of cells having a particular conformance time instead of a single cell. In this implementation, a cell is merely appended to the linked list corresponding to its conformance time. Because only one cell may be transmitted at a time, an additional transmit queue is required to enqueue multiple cells for output. This implementation does reduce the need for a complex exact priority queue, but also has several disadvantages.

The primary disadvantage is the need to accomodate the maximum possible number of conformance times while accounting for switch capacity limitations and the resultant possibility of dropping non-conforming cells. Although it has been suggested that a range of consecutive conformance times could be associated with each bin to reduce the number of bins, (i.e., bin granularity>1), large bin granularity creates excessive jitter distorting traffic parameters, especially in high bandwidth connections. Moreover, this implementation does not mediate between multiple connections with simultaneously conforming cells.

A traffic shaper with multiple incoming connections can quickly develop a backlog of conforming cells simultaneously eligible for transmission. Prior art techniques for arbitrating amongst the simultaneously conforming cells have proven inadequate, frequently increasing cell-shaping delays and distorting connection parameters for all cells, even cells that conformed upon arrival. These problems can propagate through the network, violating traffic descriptors for downstream switches and further increasing delay and loss. Constant bit rate and real-time variable bit rate connections are particularly impacted because of the inherent low tolerance for delay variations.

Prior art traffic policing and shaping techniques are proving to be inadequate for B-ISDN and the heterogenous traffic of contemporary networking, resulting in traffic distortions and congestion. In particular, the prior art techniques do not efficiently handle numerous traffic classes while fairly distributing network resources amongst several connections. The unique difficulties encountered when attempting to shape traffic from several connections with widely varying rates are not adequately handled by prior art policers and shapers. For example, prior art policers are unsuitable for responding to momentary violations of contract parameters by connections that are fully compliant over the long term, resulting in avoidable packet loss or traffic disruption. Many proposed techniques for fairly distributing network resources cannot be readily implemented because they are not readily scalable or impose unacceptable costs (e.g., switching delays or hardware implementation complexity) Without efficient and scalable techniques for traffic shaping, the potential of ATM switched networks cannot be realized.

SUMMARY OF THE INVENTION

In view of the foregoing, there is a need for scalable traffic shaping in a communications network that fairly distributes network resources between widely variant connections without incurring excessive costs.

The present invention simultaneously reduces implementation complexity and traffic distortions by a novel integration of leaky-bucket traffic shaping and rate-based link scheduling. The present invention is able to shape traffic at the edges of a network while equitably distributing bandwidth, even during periods of bursty traffic Moreover, the present invention can also schedule links in a network interior, reducing cell delay jitter and downstream buffering requirements.

Traffic shaping in the present invention is achieved through a novel combination of techniques. The initial step is to separately enqueue each connection coming into the switch. Per-connection queues are more than then mere extensions of sorting bins because they provide a mechanism for additional network management features such as buffer management and flow control. Moreover, per-connection queuing enables each connection to be treated separately, allowing the traffic shaper to take each connection's unique traffic parameters into account when shaping traffic received from that connection. By so doing, it is possible to perform weighted scheduling that provides preferential treatment to connections with critical parameters. Weighted scheduling ensures that high bandwidth connections or connections with no delay tolerance (e.g., real-time video) are able to maintain QOS when switched with low bandwidth or ABR connections.

Per-connection queuing alone will not optimally shape network traffic. Another aspect of the present invention is "approximate sorting," ensuring that cells leave the traffic shaper approximately, but not exactly, in order of conformance time. This is unlike prior art systems that perform exact sorting, with each cell leaving the traffic shaper having a conformance time equal to or greater than the conformance time of the preceding cell. Approximate sorting, like exact sorting, can be implemented with an output queue and sorting bins, but it differs from exact sorting in that the output queue can be a simple first in first out (FIFO) queue without requiring complex parallel comparison and insertion circuitry.

Approximate sorting may be implemented by moving a cell from a per-connection queue directly to an output queue if the cell's conformance time has been reached or passed and moving cells that are non-conforming into sorting bins until they conform, i.e., the cell's conformance time is reached. A cell that is in a sorting bin at its conformance time goes directly to the output queue at that time. Cells that are not moved from the per-connection queue into the output queue until after their conformance time will not be placed into the output queue at a location exactly corresponding to their relative conformance time, even though these cell bypass the sorting bins. Hence, the output queue will only be approximately sorted.

Fair arbitration amongst the incoming connections is another advantage of the present invention. There are several alternative techniques for determining when a cell from an incoming connection is processed by the traffic shaper in the present invention. The first technique is round robin arbitration, whereby a cell coming from a connection is processed every time a cell from that connection leaves the traffic shaper. During periods of heavy traffic, each incoming connection is essentially treated equally with each connection being serviced in sequence. The primary disadvantage with this technique is that backlogged high bandwidth connections process cells through the traffic shaper at the same rate as backlogged low bandwidth connections, making it difficult for the high bandwidth connections to maintain quality of service, even though overall shaping delays and traffic distortions are reduced.

The present invention addresses this problem by weighted round-robin scheduling. In weighted round-robin scheduling, some connections receive preferential treatment to ensure that more cells from the preferred connections are being processed by the traffic shaper at a given time. Weighted round-robin scheduling essentially operates by allowing several cells from a high bandwidth connection in the traffic shaper sorting unit simultaneously. Instead of processing one cell from the per-connection queue at a time, several cells are processed simultaneously. The scheduling is weighted in favor of the high bandwidth connections, ensuring that each connection has a quantity of cells in the output queue proportionate to the connection's bandwidth. This enables each connection to provide an appropriate quality of service during periods of high traffic, even if every connection is backlogged.

Weighted round-robin scheduling addresses one aspect of the difficulties created when low and high bandwidth incoming connections share a traffic shaper, but other difficulties remain. One of the difficulties inherent when connections with widely varying rates are common to a single traffic shaper is the wide variance in conformance time intervals The interval between conformance times for a low bandwidth connection is much larger than the interval between conformance times for a high bandwidth connection The possible conformance times for a low bandwidth connection may extend far into the future, especially relative to the possible conformance times of high bandwidth connections. It is frequently impractical to have sorting bins corresponding to the conformance times of both the high bandwidth connections (with short intervals between the sorting bin conformance times) and the low bandwidth connections (with lengthy intervals encompassing several high bandwidth conformance time intervals), and increasing bin granularity distorts traffic. However, the hierarchical architecture of the present invention provides a solution to these problems that avoids traffic distortions. Grouping connections based on their bandwidth requirements provides high bandwidth connections with small granularity sorting advantageously reducing jitter and cell shaping delay without requiring a prohibitively large number of sorting bins. Moreover, the weighted round-robin scheduling techniques of the present invention are equally applicable to arbitration between groups, further reducing traffic distortion and improving traffic shaper performance.

The advantages and alternatives of the integrated traffic shaper disclosed herein is described in J. Rexford et al., "A Scalable Architecture for Fair Leaky-Bucket Shaping," to be published in Proceedings, IEEE INFOCOM, April, 1997; and J. Rexford et al, "Scalable Architectures for Integrated Traffic Shaping and Link Scheduling in High-Speed ATM Switches," to be published in IEEE Journal on Selected Areas in Communications, Special Issue on Advances in ATM Switching Systems, 1997, the disclosures of which are incorporated by reference herein.

This invention provides an integrated system for shaping traffic in packet-switched networks that ensures resources are fairly shared between all switched connections while maintaining minimum QOS for each connection. This unique integration of novel techniques forms a traffic shaper capable of providing traffic shaping for the variety of network traffic classes possible in ATM networks. In contrast to prior art traffic shaping techniques, the present invention arbitrates fairly between all incoming connections and is highly scalable, thereby enabling Asynchronous Transfer Mode networks to be used to their full potential.

DETAILED DESCRIPTION

A novel traffic shaper for use in a packet switched network is described herein. This traffic shaper is optimally suited for, but not limited to, high speed switches in an Asynchronous Transfer Mode network. The disclosed traffic shaper is a novel implementation of per-connection queuing and approximate sorting techniques suitable for shaping traffic arriving from several connections with varying bandwidth and traffic characteristics such as burstiness. This novel implementation is highly scalable, requiring only a fixed number of operations to process a cell upon arrival or departure from the traffic shaper. By integrating link scheduling into the traffic shaper, the present invention is able to fairly allocate network resources between incoming connections in a novel manner that guarantees a minimum Quality Of Service for each connection. A novel hierarchical implementation of the present invention is disclosed by which traffic from connections with widely variant bandwidth requirements can be fairly shaped without excessive hardware requirements. An efficient hardware implementation of the present invention is also disclosed.

Figure 1:
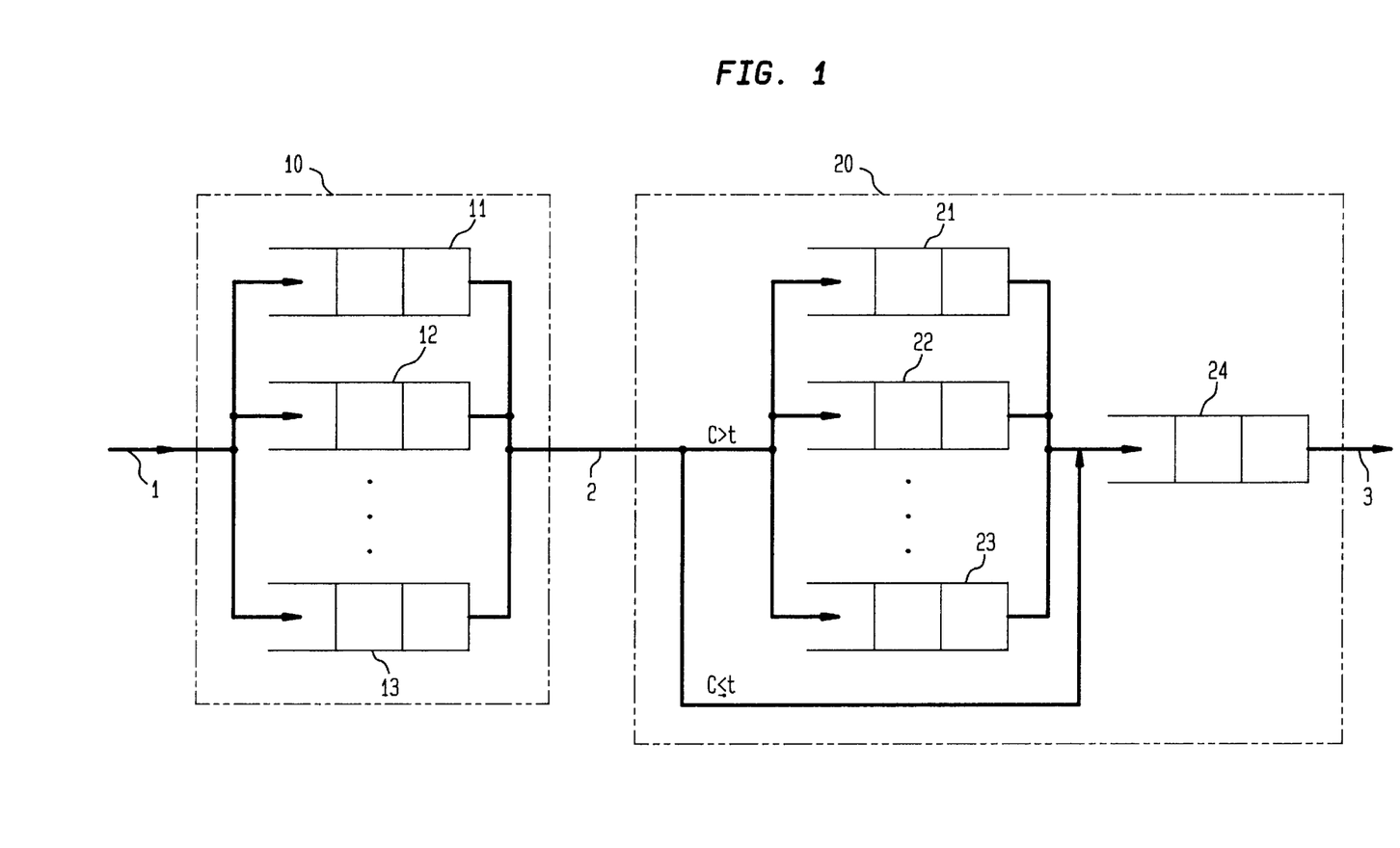
FIG. 1 is a schematic representation of a scalable shaping architecture according to an embodiment of the present invention.

FIG. 1 illustrates the scalable architecture of the novel traffic shaper In one embodiment of the present invention, cells enter the traffic shaper through input 1 and are initially routed to a set of connection queues 10. The set of connection queues 10 interface to a sorting unit 20 across connection 2 and the cell is ultimately transmitted to the network through output 3. Although only three connection queues 11, 12 and 13 are shown in FIG. 1, there is a queue for each connection coming into the traffic shaper, e.g., a traffic shaper with ten incoming connections would have ten queues. In a preferred embodiment of the present invention the connection queues are first in first out linked lists (FIFOs).

Cells that arrive from an idle connection pass directly through the connection FIFOs 10 and across connection 2 to sorting unit 20. If the connection is not idle, i.e., if a previous cell from the connection is in connection FIFOs 10 or sorting unit 20, the newly arrived cell is enqueued on the appropriate connection FIFO. A cell entering sorting unit 20 will be enqueued on a sorting bin 21, 22 or 23 if it is non-conforming or enqueued on an output queue 24 if it is conforming.

A cell is conforming if its conformance time c has been reached or passed (i.e., $c \leq t$). In the preferred embodiment, cells are not placed in the transmission queue in exact order of conformance times. Instead, transmission queue 24 is a FIFO which is approximately sorted by conformance times. Cells entering sorting unit 20 from connection FIFOs 10 after their conformance time are not inserted into transmission queue 24 at the exact position corresponding to their conformance time but are instead appended to the end of transmission queue 24. Although a cell entering sorting unit 20 at its conformance time is also appended to the end of transmission queue 24, this operation enqueues the cell at the same location exact sorting would since no cells with later conformance times are in transmission queue 24. Cells enqueued from a sorting bin are similarly positioned in transmission queue 24 at the exact sorting location (assuming bin granularity of 1).

The approximate sorting of the present invention advantageously reduces implementation complexity in the traffic shaper. For example, parallel insertion capability is not required in the transmission queue. More significantly and perhaps unexpectedly, approximate sorting performs better than exact sorting for connections with similar bandwidth characteristics by guaranteeing a minimum service rate for each connection on a small time scale.

The number of sorting bins required for the sorting unit is advantageously independent of the number of incoming connections or the amount of backlogged traffic at the switch. The granularity of the bins (i.e, the number of consecutive conformance times associated with a single bin) and the shaping rate of the slowest incoming connection (i.e., the minimum shaping rate, $\rho_{min}$) determine the maximum number of sorting bins required for the illustrated embodiment of the present invention. The optimal number of sorting bins for a sorting unit in the present invention varies depending on the divergence of incoming connection bandwidth parameters; the lowest shaping rate determines the range and the highest shaping rate determines the grain.

The bounded number of sorting bins is a product of per-connection queuing. A cell arriving in sorting unit 20 will have a conformance time $1/\rho$ or less time slots in the future. Cells with conformance times farther in the future will be enqueued in a connection FIFO until the previous cell from that connection has been transmitted. For example, if a cell in sorting unit 20 was transmitted at its conformance time, the next cell from the same connection will necessarily conform in $1/\rho$ time slots (or less if the connection has unused $\sigma$) and would be placed in the corresponding sorting bin.

Because of the bounded number of sorting bins and the reduced complexity of a single approximately sorted transmission FIFO, the present invention has a highly scalable architecture. The scalability of the present invention is further enhanced because a small, bounded number of operations are performed each time a cell arrives at or departs from the novel traffic shaper. Thus, only the number of connection queues increases in direct proportion to the number of connections to the traffic shaper.

Figure 2:
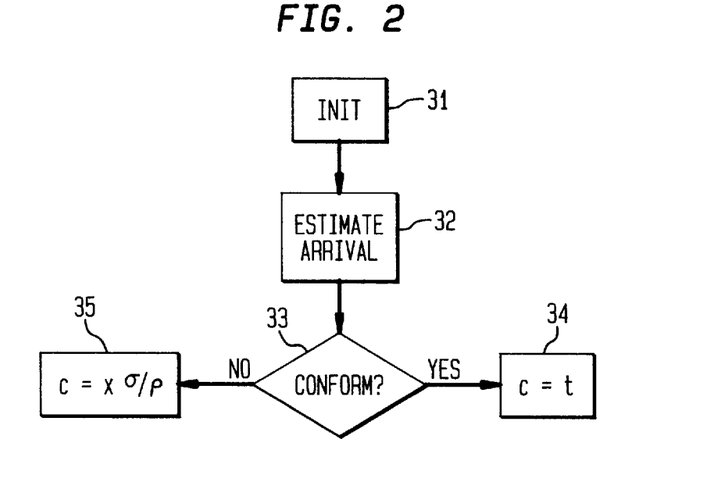
FIG. 2 is a flowchart representation of a procedure for determining the conformance time of an arriving cell.

The first thing that occurs when a cell arrives at the traffic shaper is computation of the cell's conformance time c. Conformance time is the time at which an arriving cell conforms to the contracted traffic parameters of the connection the cell is coming from. These traffic parameters represent a negotiated agreement between the network and the connection whereby the network agrees to provide a specific quality of service and the connection agrees to only transmit a specific number of cells in a given interval. The rate at which the connection agrees to transmit cells to the network is the bandwidth or shaping rate $\rho$. In addition, the network may agree to allow the connection to transmit bursts of cells exceeding the negotiated shaping rate. The number of negotiated excess cells is the burstiness, $\sigma$, of the connection. In one embodiment of the present invention, conformance time is computed using the generic cell rate algorithm of the ATM Forum as illustrated by the flowchart of FIG. 2.

A cell's conformance time is determined from the cell's estimated arrival time, X, the contracted traffic parameters for the cell's connection, $\rho$ and $\sigma$, and the arrival time of the last cell from the same connection. Referring to step 31 of FIG. 2, if a cell has not been received from a connection for a relatively long period of time or the traffic shaper has just been initialized, the state variable X, representing the cell's arrival time, is initialized to $-1/\rho$ to avoid clock wrap-around errors. If X is not reinitialized then it corresponds to the arrival time of the previous token received from the connection. The cell's arrival time is estimated at step 32. A cell's estimated arrival time is $X+1/\rho$ or the current time, t, whichever is greater. Whether the estimated arrival time X complies with the traffic contract is determined at step 33 where X is compared to $t+1/\rho$. If X is less than or equal to $t+\sigma/\rho$ then the connection is complying with the traffic contract and the cell is conforming as shown in step 34. In the case of a conforming cell, conformance time c equals the current time t. As shown in step 35, if X is greater than $t+\sigma/\rho$ the cell is non-conforming and the conformance time is set to comply with the contracted traffic parameters, $c=X-\sigma/\rho$.

Figure 3:
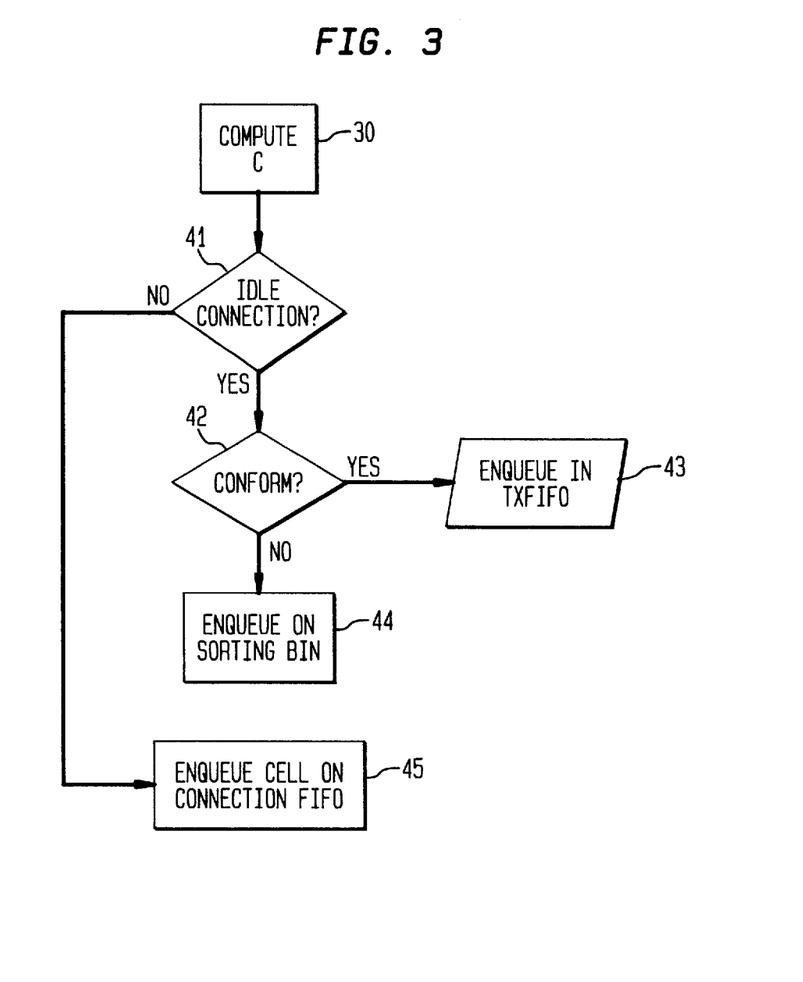
FIG. 3 is a flowchart representation of a procedure for traffic shaping upon cell arrival.

The operations performed when a cell arrives at the traffic shaper are shown in FIG. 3. As noted above, the first operation performed is computation of cell conformance time, c, as shown in step 30. As shown in step 41, the next operation is a determination of whether the connection is currently idle, i.e., there are no cells from the connection enqueued in the connection FIFO or the sorting unit. As shown in step 42, if the cell is idle, then a determination is made as to whether the cell is conforming. If the cell conforms, $c==t$, the cell is enqueued on the transmission FIFO as shown in step 43. If the cell is non-conforming, the cell is enqueued on a sorting bin as shown in step 44. In an embodiment having b sorting bins of grain g in the sorting unit, the cell is enqueued onto sorting bin $[(c \bmod bg)/g]$. If the connection is not idle, the cell is enqueued on the connection FIFO as shown in step 45.

Figure 4:
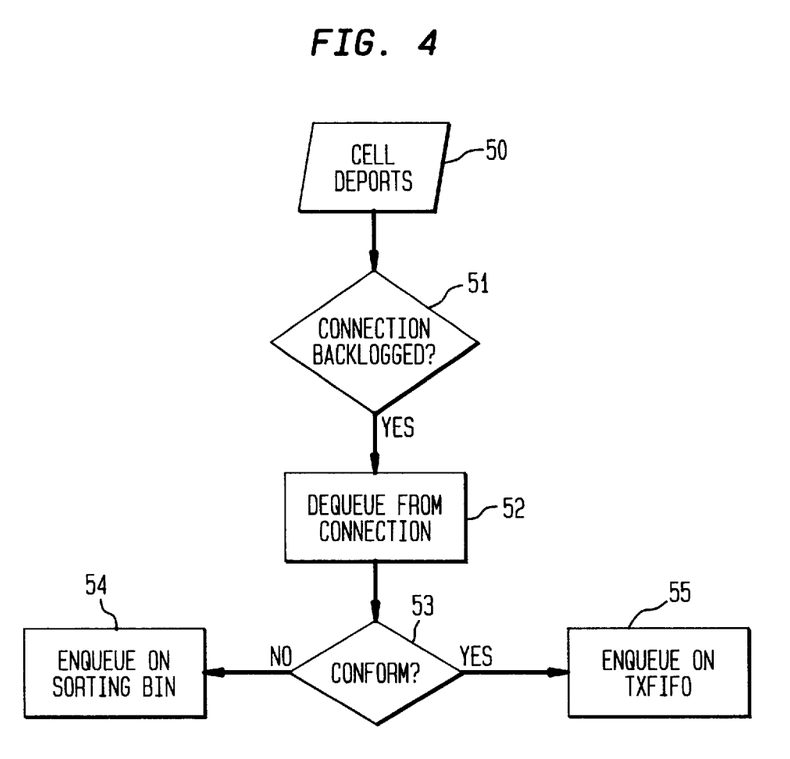
FIG. 4 is a flowchart representation of a procedure for traffic shaping upon cell departure.

The operations performed when a cell departs from the traffic shaper are shown in FIG. 4. When a cell received from a connection departs as shown in step 50 a determination is made as to whether the departed cell's connection is still backlogged as shown in step 51. If the connection is not backlogged then the connection is idle and no further operations are performed. If the connection is still backlogged then a cell is dequeued from the connection FIFO as shown in step 52. A determination is made as to whether the cell is conforming, $c \leq t$, as shown in step 53. If the cell is non-conforming, it is enqueued on a sorting bin as shown in step 54. In the embodiment having b sorting bins of grain g in the sorting unit, the cell is enqueued onto sorting bin [(c mod bg)/g]. If the cell is conforming then it is enqueued on the transmission FIFO as shown in step 55.

An additional operation performed during each time slot is appending the conforming cells enqueued in a sorting bin onto the transmission FIFO. In the embodiment having b sorting bins of grain g in the sorting unit, sorting bin [(t mod bg)/g] is appended to the transmission FIFO when the cells in the sorting bin are conforming, i.e., when (t mod g)== (g−1). This is a background operation, the concatenation of two linked lists, and advantageously does not initiate any data transfers in the present invention.

An alternative embodiment of the present invention which does not require time stamps for each arriving cell is possible because of approximate sorting. Unlike exact sorting leaky-bucket traffic shaping, in which the conformance time of every head-of-line cell must be determined so a cell can be placed into its exactly sorted position in the output queue, approximate sorting only requires calculation of non-conforming head-of-line cell conformance times. However, non-conforming head-of-line cell conformance times can be readily determined by the traffic shaper if it maintains per-connection state information, specifically the value of the state variable X when the first non-conforming cell arrives. This saved value, $X_b$, is the state of the "boundary cell" at the boundary between conforming and non-conforming cells. Subsequent non-conforming cells will be spaced $1/\rho$ apart and their conformance times can therefore be readily computed from $X_b$. When a conforming cell subsequently arrives from the connection all previously received cells will necessarily be conforming and $X_b$ can be reset to null. This ensures that there is only one boundary cell per connection at any time, even if the shaper is unable to keep up with conforming traffic. Thus, by determining the boundary between conforming and non-conforming cells, this alternative embodiment is able to eliminate calculation and storage of conformance time for each buffered cell.

This alternative embodiment can also advantageously respond to dynamic variations in connection bandwidth parameters. First, the traffic shaper can implicitly adjust cell conformance times by applying a new value of $\rho$ when computing conformance time c and updating the boundary state $X_b$. Since the current state variable X is calculated from $X_b$ and the number of non-conforming cells enqueued in the connection FIFO, the traffic shaper can readily adjust the current state variable X to account for changes in the shaping rate p. The state variable X is adjusted as follows: $X \leftarrow X_b + (X - X_b)\rho^{old}/\rho^{new}$. The new rate $\rho^{new}$ is therefore advantageously applied to nonconforming cells that haven't entered the sorting unit instead of waiting until the connection backlog has been processed by the traffic shaper.

The cell departure operations described above with respect to FIG. 4 ensure that incoming connections are serviced on a round-robin basis when the incoming connections are backlogged. Transmitting cells from the transmission FIFO causes the output link to implicitly sequence through these connections. This procedure most fairly arbitrates between incoming connections when the incoming connections have similar bandwidths. Another embodiment of the invention addresses where incoming connections have widely varying bandwidths.

The alternative embodiment uses weighted round-robin scheduling whereby each connection receives service in proportion to its bandwidth descriptor $\rho$. Instead of only allowing one cell from a connection in the sorting unit (sorting bins and transmission FIFO) at a time, each connection could have a number of cells in the sorting unit. The number of cells allowed would be proportionate to the connection bandwidth and the bandwidth of the slowest incoming connection. For example, connection $\alpha$ would have 0 to $\rho_\alpha/\rho_{min}$ cells in the sorting unit at a times where $\rho_\alpha$ is the shaping rate of connection $\alpha$ and $\rho_{min}$ is the shaping rate of the incoming connection with the lowest bandwidth. By integrating novel rate-based fair link scheduling and traffic shaping in this manner, the present invention advantageously ensures that each incoming connection receives sufficient bandwidth on a small time scale. The novel integrated traffic shaper is thus able to maintain quality of service for connection traffic and reduce traffic distortions without increasing the number of sorting bins or inhibiting the scalability of the traffic shaper.

Figure 5:
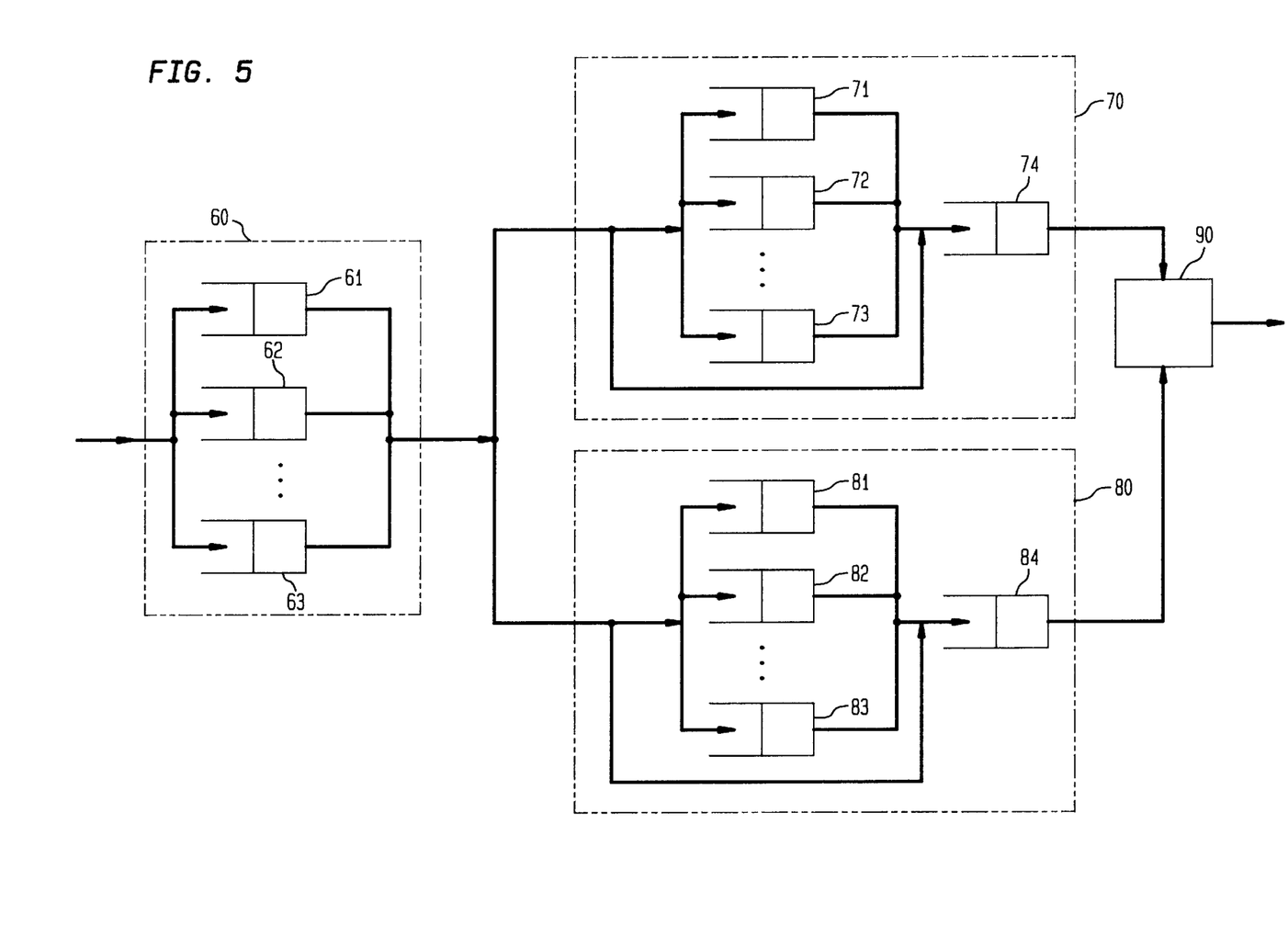
FIG. 5 is a schematic representation of a hierarchical scalable shaping architecture according to the present invention.

FIG. 5 illustrates another alternative embodiment of the present invention whereby several incoming connections with widely varying bandwidth parameters without adversely affecting high bandwidth traffic. As discussed above, low bandwidth connections will input cells into the traffic shaper that have conformance times far ahead of cells from high bandwidth connections. Thus, low bandwidth connections require sorting bins capable of handling a wide range of conformance times. Although it is possible to reduce the number of required sorting bins by using sorting bins with a high granularity g, highly granular or coarse sorting bins are unsuitable for high bandwidth connections because of the shaping delay and jitter they introduce in high bandwidth traffic.

The alternative embodiment of the present invention resolves this dilemma by a novel hierarchical traffic shaper architecture in which connnections are grouped by bandwidth requirements. As shown in FIG. 5, the traffic shaper includes a set of connection FIFOs 60 but, instead of a single sorting unit, there are separate sorting units 70 and 80. As in the non-hierarchical architecture of FIG. 1, the set of connection FIFOs 60 is simply a set of queues 61, 62 and 63 with one queue for each incoming connection. Similarly, each sorting unit 70 and 80 consists of sorting bins (71, 72 and 73 or 81, 82 and 83) and a transmission queue 74 or 84. Although only two sorting units are explicitly shown in FIG. 5, the present invention is not so limited.

Each separate sorting unit with bins of grain g and range bg corresponds to a separate group of connections having similar bandwidth parameters. The separate groups of the hierarchical architecture advantageously enables optimization of the sorting unit parameters g and bg for a specific range of bandwidths without requiring an excessive number of sorting bins or distorting traffic.

As shown in FIG. 5, the hierarchical architecture of the alternative embodiment requires a group arbiter 90 to multiplex the cells from the separate sorting unit transmission queues and fairly arbitrate between the groups. Fair arbitration between the groups may be efficiently implemented on the basis of group weight $\phi$ using rate-based link scheduling algorithms known to those of ordinary skill in the art. Essentially, each group i has a weight $\phi_i$ representing the aggregate bandwidth requirements of the group. For example, $\phi_i$ may equal the sum of $\rho_\alpha$ across all connections $\alpha_i$ in group i. A fair portion of the link bandwidth would be $\phi_i/\Sigma\phi_j$, for j=0 to n−1, where n is the number of groups.

In the embodiment of the present invention where the group weight is static, i.e., $\phi_i=\Sigma\rho_{\alpha i}$, the unused bandwidth from an idle connection is divided between the busy connections in the same group and is not available to other connections in other groups. This is particularly advantageous when each group corresponds to a specific traffic class or protocol family because each connection has a guaranteed bandwidth through the traffic shaper.

In another alternative embodiment of the present invention, group weights are dynamic. In this embodiment, $\phi_i(t)=\Sigma\rho_{\alpha i}$ for $\alpha_i \in B_i(t)$ where $B_i$ is the set of backlogged connections in group i at time t, and bandwidth is shared between individual connections by altering the group weight $\phi_i$ as a function of aggregate throughput requirements of backlogged connections. The set of backlogged connections, $B_i(t)$, and thus the group weight, $\phi_i$, changes dynamically as cells arrive and depart and connections are idled or backlogged. For example, if a connection $\alpha_i$ is backlogged then $\phi_i=\phi_i+\rho_{\alpha i}$ whereas if a connection $\alpha_i$ is idled then $\phi_i=\phi_i-\rho_{\alpha i}$.

The dynamic group weights may be used advantageously to divide unused bandwidth between all incoming connections in a hierarchical architecture by extending known fair scheduling algorithms. For example, self-clocked fair queuing algorithms known to those of ordinary skill in the art can be readily modified for dynamic group weights. A self-clocked fair queuing algorithm arbitrates on the basis of virtual finishing times, $F_i$, that is computed using a simple recurrence and closely approximates weighted fair queuing algorithms. In essence, the traffic shaper arbitrates by transmitting the cell from the backlogged group with the minimum $F_i$ in each transmission slot. The virtual finishing time $F_i$ reflects bandwidth consumed by the group i by incrementing $F_i$ by $1/\phi_i$ after each transmission from group i. Fair arbitration occurs by assigning a value of $F_i=F^{serv}+1/\phi_i$, where $F^{serv}$ is the virtual finishing time of the group currently in service, whenever group i is backlogged. Previously idle groups are thus precluded from taking credit for past bandwidth.

Figure 6:
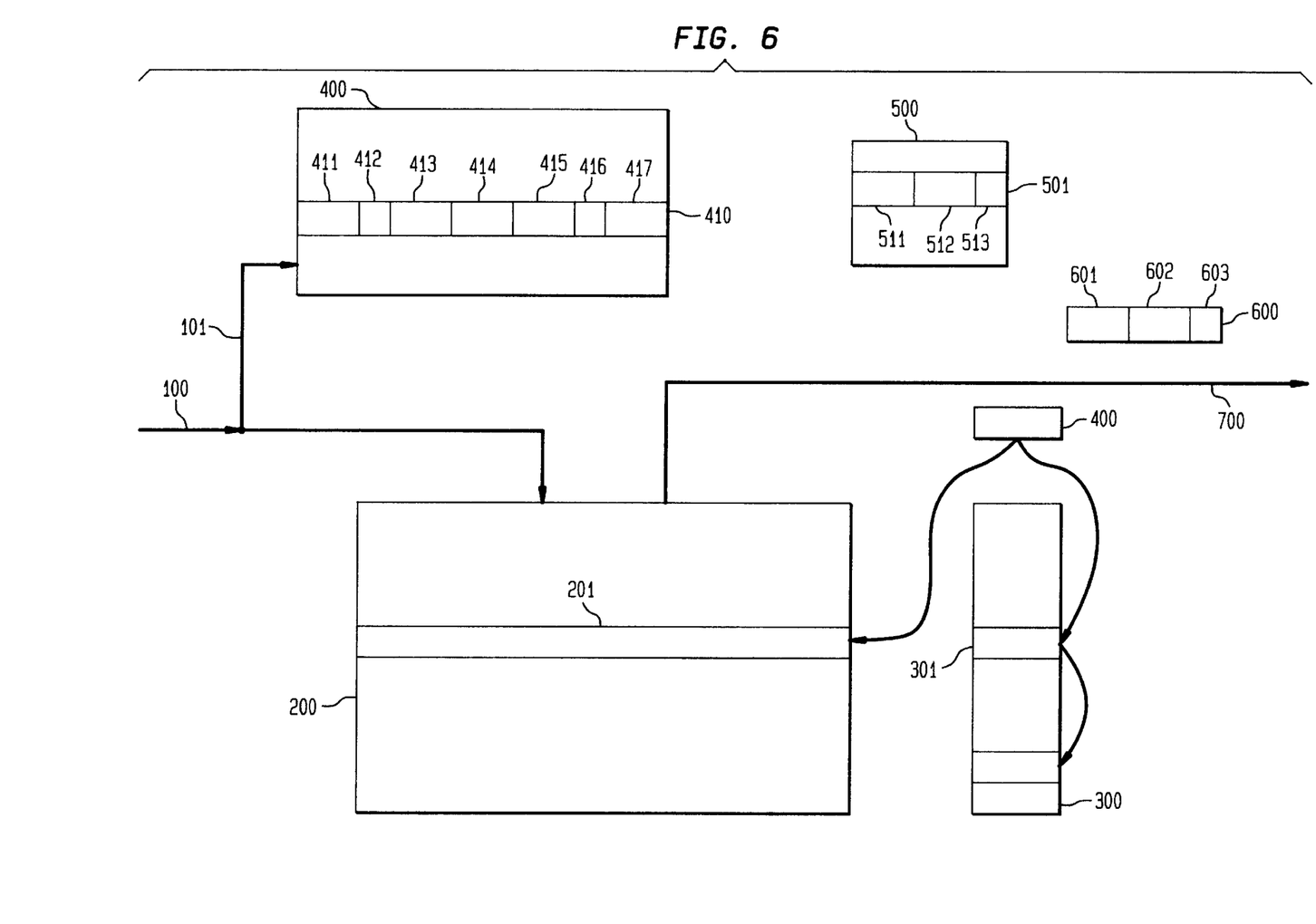
FIG. 6 is a block diagram representation of a hardware implementation of an embodiment of the present invention.

An efficient hardware implementation of the present invention is illustrated in FIG. 6. In this implementation, the connection queues, sorting bins and transmission queues are implemented as linked lists of cells buffered in a cell memory with associated pointer fields.

Referring to FIG. 6, a cell enters the traffic shaper at input 100, a serialized stream of cells from one or more incoming connections. The arriving cell is buffered in cell memory 200 at memory location 201.

Each buffered cell includes a pointer field 301 in an array of pointers 300 that denote each location in the cell memory. A free list 400 is also maintained in the shaper for assigning available memory locations to arriving cells. In a preferred embodiment, the free list is maintained as a last-in first-out list using the pointers 300 as shown in FIG. 6. For example, if cell memory location 201 was used by the last cell to leave the traffic shaper then the arriving cell would be buffered in memory location 201 denoted by pointer 301 associated with free list 400.

A connection identifier 101 is associated with each arriving cell and processed by the corresponding connection entry 410 in connection table 400. Each connection entry 410 includes fields that describe the connection and maintain the associated connection FIFO.

The connection descriptor fields are burst tolerance, $\sigma/\rho$, 411, shaping rate, $\rho$, 412, and state variable, X, 413. As discussed above, the values in these fields are used to determine conformance time of cells arriving from the connection corresponding to connection entry 410.

Each connection queue is implemented as a linked list FIFO in the embodiment of FIG. 6. Thus, the connection FIFO fields include a head pointer 414 and a tail pointer 415. The head pointer 414 points to the location of the buffered cell that is at the head of the connection queue while the tail pointer 415 points to the location of the buffered cell at the end of the connection queue. An empty flag 416 indicates whether there are any buffered cells buffered in the connection queue. In an implementation using round-robin arbitration, a flag 417 indicates whether any head-of-line cells from the connection are in the sorting unit (sorting bins or output queue) In an alternative implementation using weighted round-robin scheduling, register 417 is a counting semaphore indicating the number of cells from the connection that are in the sorting unit.

A cell buffered in cell memory 200 will only be enqueued in a connection FIFO if the connection is backlogged when the cell arrives. If the connection is not busy but the cell is non-conforming at arrival, the cell is enqueued onto a sorting bin 501 in sorting bins 500. Each sorting bin is implemented as a linked list in the embodiment of FIG. 6. Thus, the sorting bin fields include a head pointer 511 and a tail pointer 512. The head pointer 511 points to the location of the buffered cell that is at the head of the sorting bin linked list while the tail pointer 512 points to the location of the buffered cell at the end of the sorting bin linked list. An empty flag 513 indicates whether there are any buffered cells in the sorting bin.

If a cell is conforming upon arrival from an idle connection, the cell is enqueued onto the output queue 600. The output queue is implemented as a linked list FIFO (transmission FIFO) in the embodiment of FIG. 6. The transmission FIFO fields include a head pointer 601 and a tail pointer 602. The head pointer 601 points to the buffered cell at the head of the transmission FIFO and the tail pointer 602 points to the buffered cell at the end of the transmission FIFO. An empty flag 603 indicates whether there are any buffered cells in the transmission FIFO. In the embodiment shown in FIG. 6, the cell pointed to by the head pointer 601 is read from cell memory 200 and transmitted through output 700 at each time slot.

The integrated traffic shaper architecture shown in FIG. 6 further includes an arithmetic logic unit to perform the comparison and pointer manipulation operations of the present invention. In addition, a separate memory may be necessary to store cells awaiting service by the traffic shaper.

Because the data structures of the traffic shaper are implemented as linked lists, cells can be efficiently moved between logical FIFO queues by manipulating pointers. Moreover, using separate memory modules for each data structure as shown in FIG. 6 enables overlapping operations to be performed on different units, advantageously achieving greater concurrency in processing cell arrivals and departures.

Although various embodiments are specifically illustrated and described herein, it will be appreciated that modifications and variations of the present invention are covered by the above teachings and within the purview of the appended claims without departing from the spirit and intended scope of the invention. For example, integrated scheduling may be based on delay or QOS parameters in addition to or in lieu of connection shaping rate. Alternatively, cell conformance could be determined on the basis of connection shaping rate and output scheduling determined on the basis of allowable connection delay. Moreover, the novel traffic shaping disclosed herein could be applied to a traffic shaper with several outputs and a common cell memory.

What is claimed is:

1. A method of shaping traffic in a packet switched network having at least one incoming connection and at least one outgoing connection, comprising the steps of:

enqueing packets received from an incoming connection on a queue associated with said incoming connection;

determining the conformance time of each packet received from an incoming connection;

transferring a packet at the head of said queue associated with said incoming connection to an output queue or to one of a plurality of sorting bins if said packet's conformance time is later than the current time;

transferring a packet from one of said plurality of sorting bins to said output queue when said current time precedes or is simultaneous with said packet's conformance time; and transmitting a packet from said output queue.

2. The method of shaping traffic in claim 1 wherein each said queue associated with said incoming connection is uniquely associated with a single incoming connection.

3. The method of shaping traffic in claim 1 wherein each said queue associated with said incoming connection is a first in first out queue.

4. The method of shaping traffic in claim 1 wherein a shaping rate and a burst tolerance is associated with each said incoming connection and said step of determining the conformance time of a packet received from an incoming connection comprises the steps of:

estimating said packet's arrival time;

evaluating the chronological relationship between said packet's estimated arrival time and said packet's actual arrival time; and determining said packet's conformance time based on said evaluation of said packet's estimated arrival time relative to said packet's actual arrival time.

5. The method of shaping traffic in claim 4 wherein said step of determining said packet's conformance time based on said evaluation of said packet's estimated arrival time relative to said packet's actual arrival time comprises the steps of:

determining said packet's conformance time is equal to said actual arrival time when said estimated arrival time precedes or is simultaneous with said actual arrival time; and determining said packet's conformance time precedes said estimated arrival time by an interval corresponding to said burst tolerance and said shaping rate when said actual arrival time precedes said estimated arrival time.

6. The method of shaping traffic in claim 4 wherein a shaping rate and a burst tolerance is associated with each said incoming connection and said step of estimating said packet's arrival comprises estimating said arrival time as a function of the shaping rate and burst tolerance of said incoming connection and the arrival time of the last packet received from said incoming connection.

7. The method of shaping traffic in claim 1 wherein said step of transferring a packet at the head of said queue associated with said incoming connection to an output queue or to one of said plurality of sorting bins occurs when a packet associated with said incoming connection is transmitted from said output queue.

8. The method of shaping traffic in claim 1 further comprising the step of transferring a plurality of packets from said queue associated with said incoming connection to at least one of said plurality of sorting bins or said output queue.

9. The method of shaping traffic in claim 8 wherein a shaping rate is associated with each said incoming connection and the maximum number of packets associated with one of said incoming connections in said plurality of said sorting bins and said output queue is a function of the shaping rate of the incoming connection having the slowest shaping rate and the shaping rate of said one of incoming connections associated with said packets.

10. The method of shaping traffic in claim 1 wherein each of said sorting bins is a linked list.

11. The method of shaping traffic in claim 1 wherein said output queue is a first in first out queue.

12. The method of shaping traffic in claim 1 wherein each of said packets has a fixed size.

13. The method of shaping traffic in claim 1 wherein each said sorting bin corresponds to a single delay period between said conformance time and said current time.

14. The method of shaping traffic in claim 1 wherein each said sorting bin corresponds to a range of delay periods between said conformance time and said current times.

15. A method of shaping traffic in a packet switched network having a plurality of incoming connections and at least one outgoing connection, comprising the steps of:

enqueuing packets received from an incoming connection on a queue associated with said incoming connection;

determining the conformance time of each packet received from an incoming connection;

transferring a packet at the head of said queue associated with said incoming connection to one of a plurality of sorting units, each of said sorting units comprising at least one sorting bin and an output queue, wherein said packet is transferred to one of said sorting bins if said packet's conformance time is later than the current time;

transferring a packet from one of said sorting bins to one of said output queues when said current time precedes or is simultaneous with said packet's conformance time;

transferring a packet from one of said output queues to a group arbiter; and transmitting a packet from said group arbiter.

16. The method of shaping traffic in claim 15 wherein said step of transferring a packet from one of said output queues to said group arbiter occurs at a frequency determined by a fair, rate-based scheduling algorithm.

17. The method of shaping traffic in claim 15 wherein said step of transferring a packet at the head of said queue associated with said incoming connection to one of a plurality of sorting units occurs at a frequency determined by a round-robin arbitration.

18. The method of shaping traffic in claim 15 wherein said step of transferring a packet at the head of said queue associated with said incoming connection to one of a plurality of sorting units occurs at a frequency determined by a weighted round-robin arbitration.

* * * * *